(12) United States Patent
Shih

(10) Patent No.: US 7,203,949 B2
(45) Date of Patent: Apr. 10, 2007

(54) CONTROL CARD LOADING AND UNLOADING MECHANISM

(75) Inventor: Shoei-Yuan Shih, Shijr (TW)

(73) Assignee: Evserv Tech Corporation, Taipei Hsien (TW)

( * ) Notice: Subject to any disclaimer, the term of this patent is extended or adjusted under 35 U.S.C. 154(b) by 479 days.

(21) Appl. No.: 10/862,309

(22) Filed: Jun. 8, 2004

(65) Prior Publication Data

US 2005/0273797 A1    Dec. 8, 2005

(51) Int. Cl.
G11B 17/03 (2006.01)
G06F 1/16 (2006.01)
(52) U.S. Cl. .................... 720/654; 361/685
(58) Field of Classification Search ........... 720/654, 720/655, 656, 657; 361/685
See application file for complete search history.

(56) References Cited

U.S. PATENT DOCUMENTS 5,233,594 A * 8/1993 Wilhelm .................. 361/685
6,272,005 B1 * 8/2001 Jensen et al. ............ 361/680
6,356,441 B1 * 3/2002 Claprood ................. 361/685
6,490,153 B1 * 12/2002 Casebolt et al. ......... 361/685
2006/0087808 A1 * 4/2006 Yang ....................... 361/685

* cited by examiner

Primary Examiner—Allen Cao
(74) Attorney, Agent, or Firm—Birch, Stewart, Kolasch & Birch, LLP

(57) ABSTRACT

A control card loading and unloading mechanism includes a loading cartridge and a loading member coupling on the front end of the loading cartridge. The loading member has a housing trough formed integrally on the coupling surface with the loading cartridge, and a coupling member to fasten a display panel. The loading member further has openings to see and control the display panel. The loading member may be fabricated without double molding, thus can simplify design and save the cost.

10 Claims, 9 Drawing Sheets

CONTROL CARD LOADING AND UNLOADING MECHANISM

FIELD OF THE INVENTION

The present invention relates to a control card loading and unloading mechanism and particularly to a loading and unloading mechanism for control cards and display panels.

BACKGROUND OF THE INVENTION

To install and assemble a computer host and control cards, the earlier conventional method is to directly fasten the control cards to the main board. When a control card has to be repaired and replaced, the entire main board has to be removed. As the control card is coupled with many connection terminals, disassembly and assembly are quite difficult. Moreover, the connection terminals might be bent or damaged and result in abnormal electric connection.

Refer to FIG. 1 for a conventional control card loading and unloading mechanism that consists of a loading cartridge 10 and a case 20. The loading cartridge 10 has a loading member 11 at the front end to hold a display panel 12. The loading member 11 and the display panel 12 are fastened to the loading cartridge 10. The loading member 11 has a door latch 13 on a lower end that has one end pivotally coupled on the loading cartridge 10 so that it may be turned on the loading cartridge 10. The door latch 13 has a lug 14 close to the coupling end to engage with an anchor notch 15 on the front end of the case 20. When the door latch 13 is turned in the forward direction, the lug 14 escapes from the anchor notch 15 to allow the loading cartridge 10 to be removed from the case 20. On the contrary, the loading cartridge 10 and the case 20 may be latched and anchored. However, such a structure still has problems to be improved, notably:

In the conventional technique set forth above, the loading member 11 holds the display panel 12, and the loading cartridge 10 is anchored on the case 20 through the door latch 13. In the control card loading and unloading mechanism, in order to hold the display panel 12 and anchor on the case 20 at the same time, the loading member 11 and the door latch 13 have to be fabricated by separated molds according to their different functions, then are coupled together. Double molding is required. The fabrication cost increases. Assembly also is more difficult. Moreover, if there is a slight dimensional deviation during fabrication of the molds of the loading member 11 or the door latch 13, coupling could be impossible, and the fabrication cost could be even higher.

SUMMARY OF THE INVENTION

The primary object of the present invention is to provide a loading and unloading mechanism that has an integrated housing trough for holding a display panel formed on one side of a loading member that is coupled with a loading cartridge. The loading member also has a coupling member corresponding to the display panel to provide a secure anchoring, and an opening to see and control the display panel. Therefore double molding is not necessary. The design is simpler, and the cost is lower.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
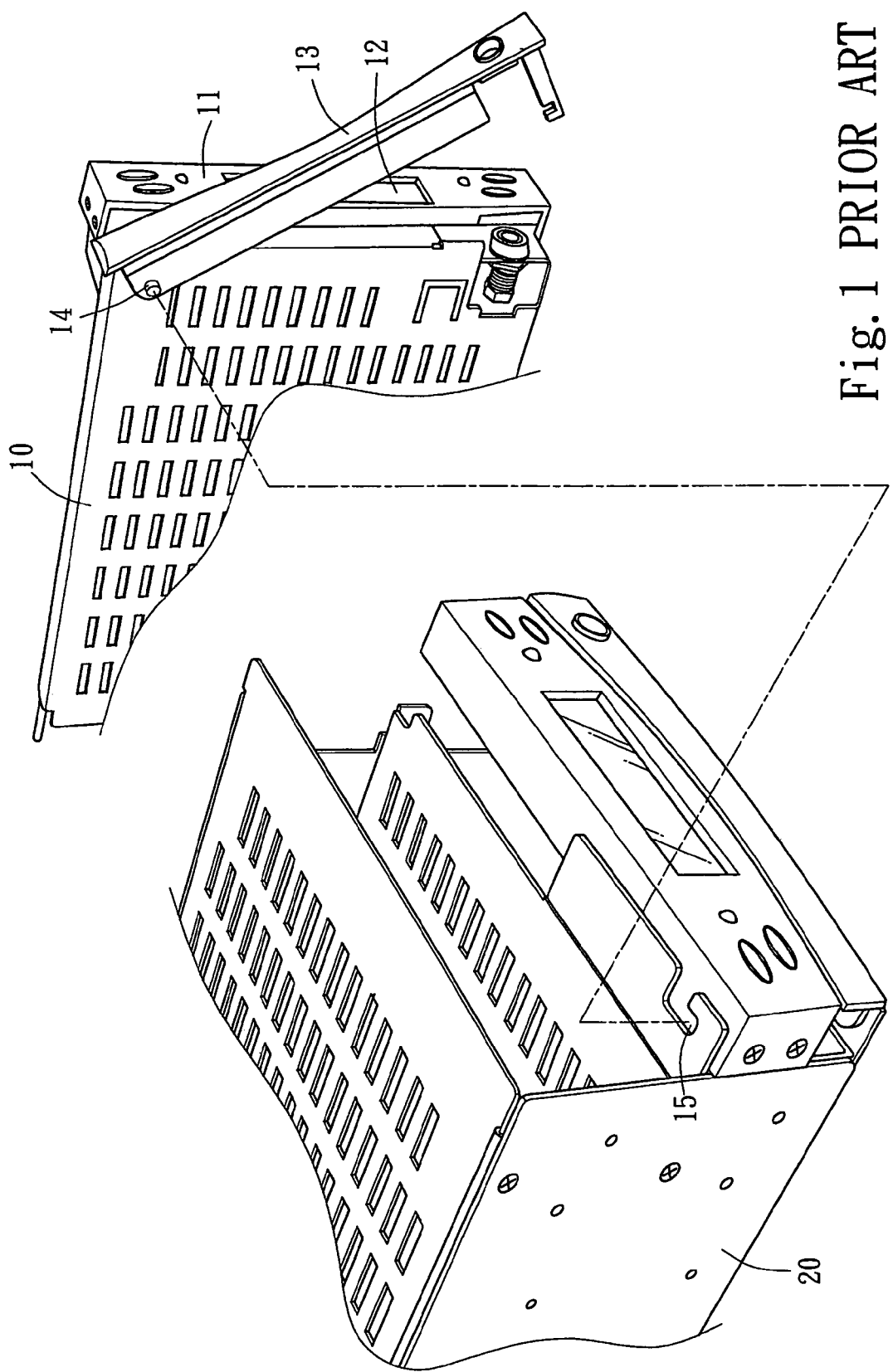
FIG. 1 is an exploded view of a conventional technique.
Figure 2:
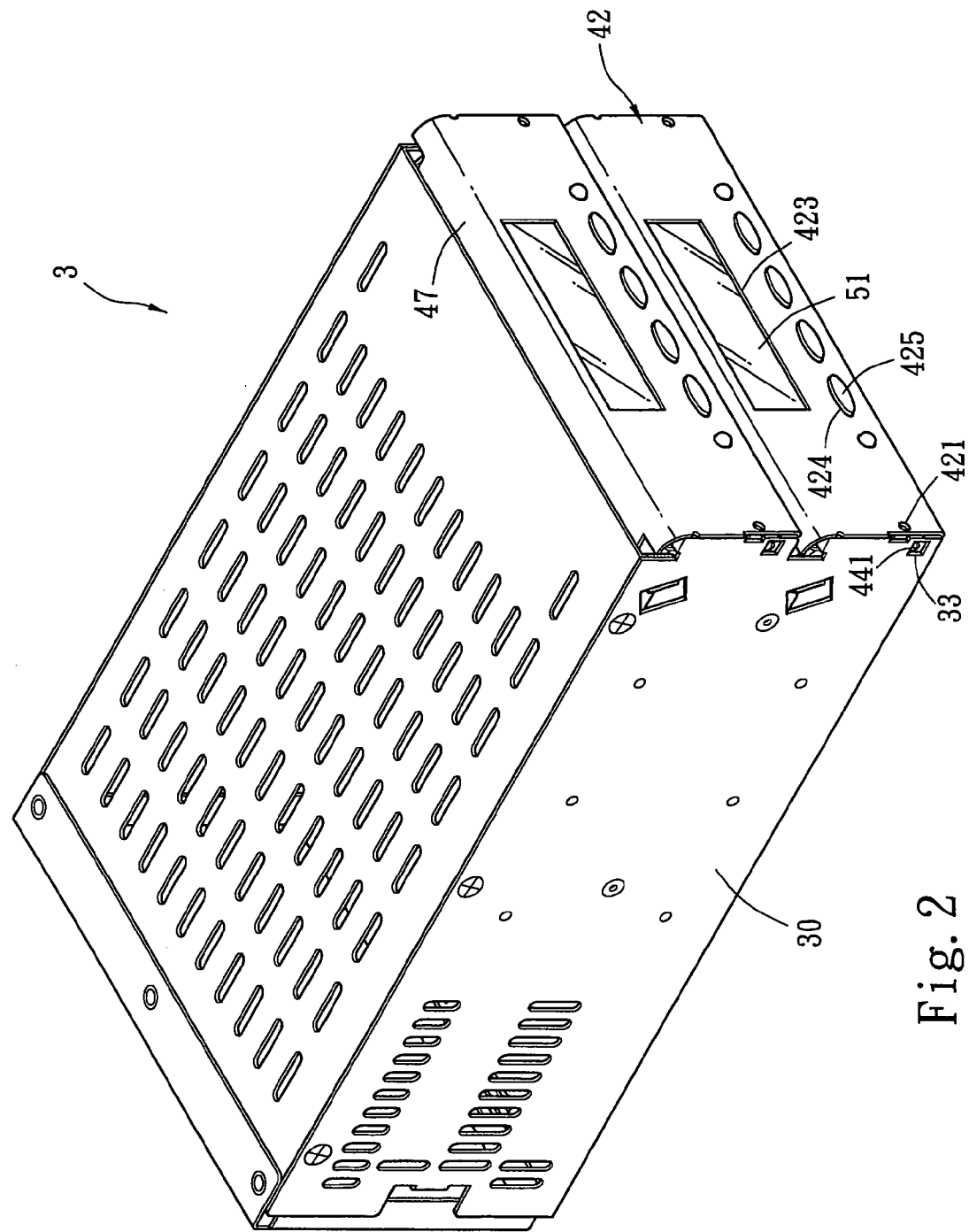
FIG. 2 is a perspective view of the invention.
Figure 3:
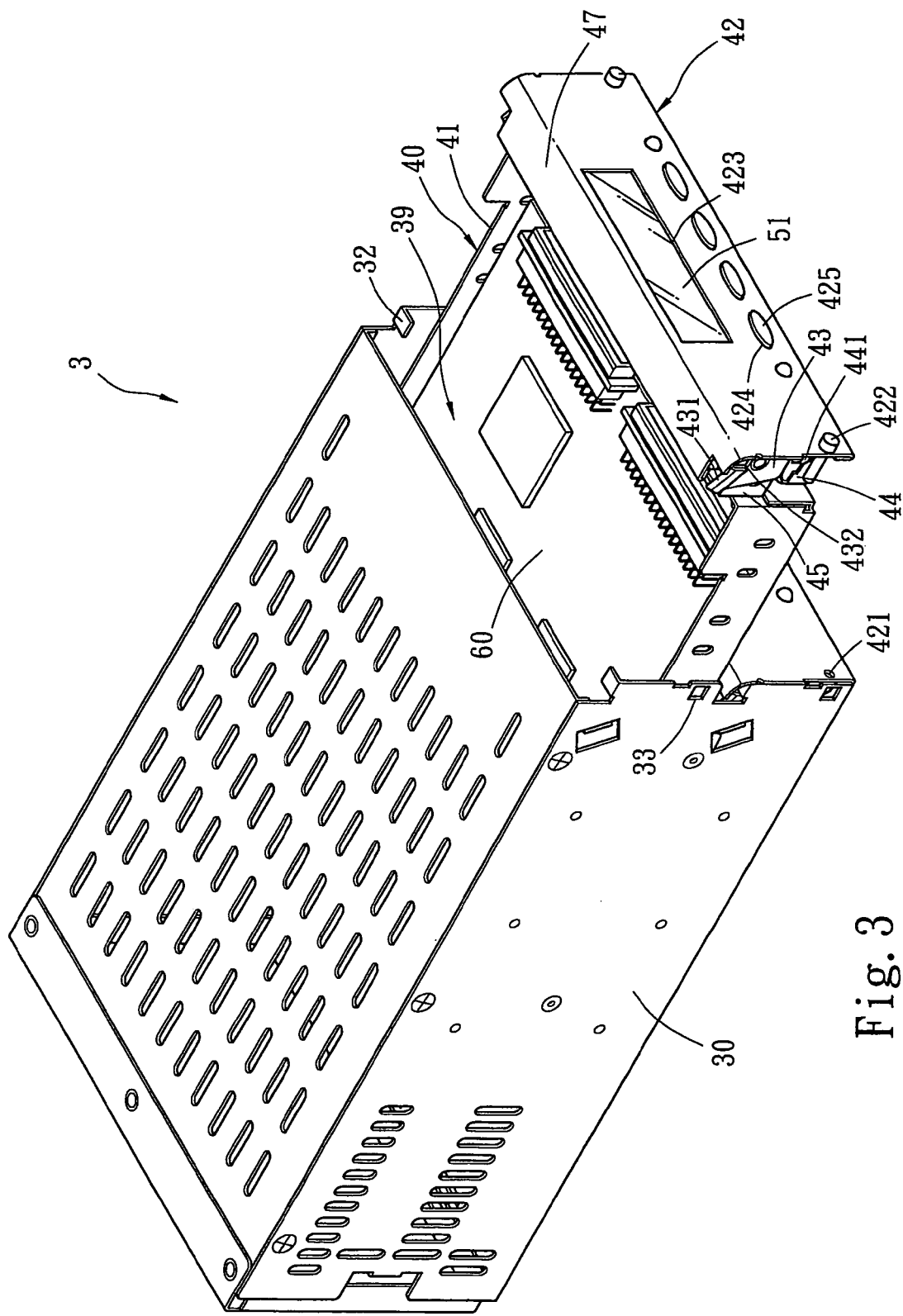
FIG. 3 is a schematic view of the invention in a use condition.
Figure 4:
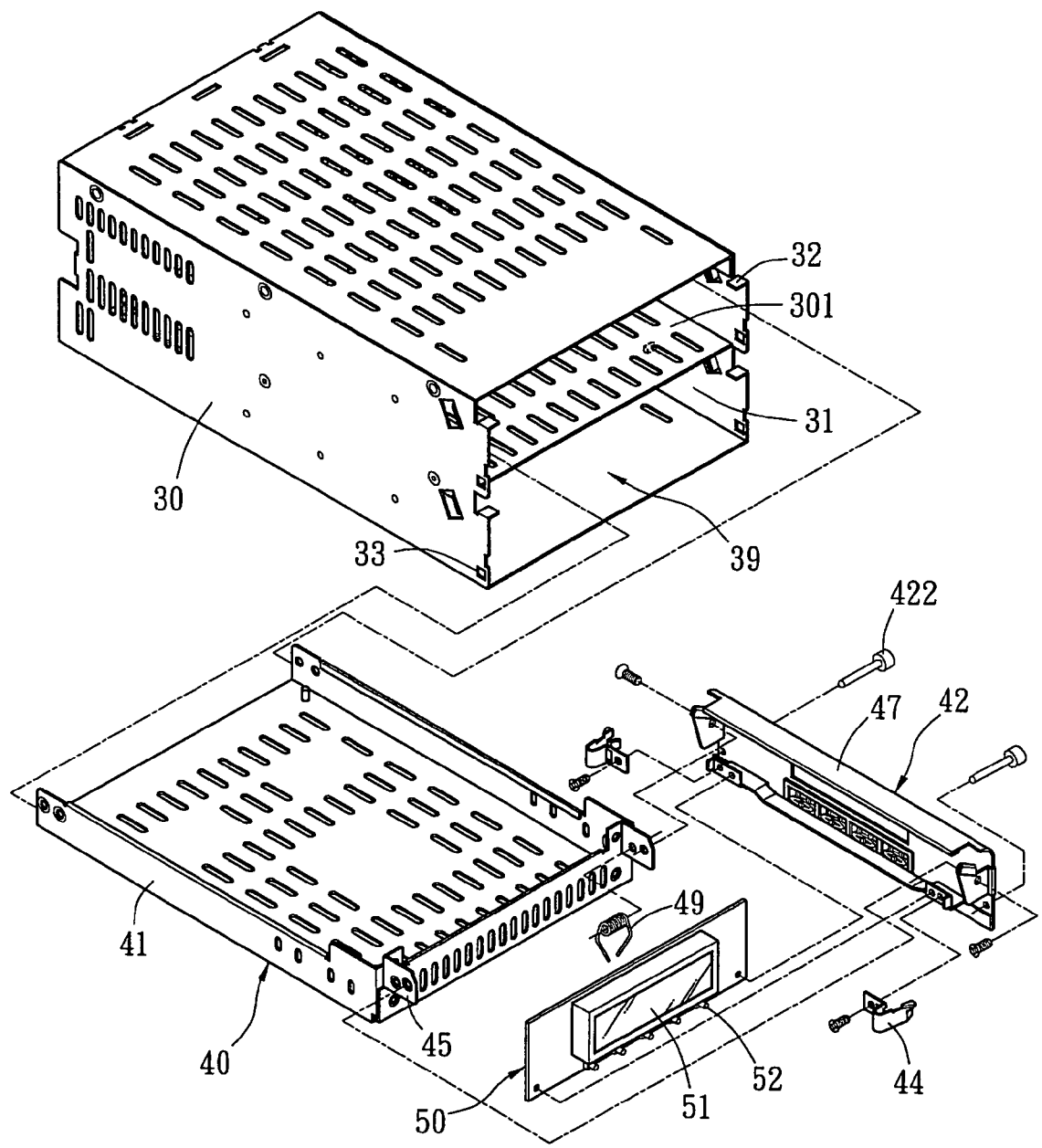
FIG. 4 is an exploded view of the invention.

Please referring to FIGS. 2, 3, and 4, the loading mechanism 3 according to the invention includes a loading cartridge 40 and a loading member 42 which located at the front end of the loading cartridge 40. The loading cartridge 40 may be loaded and unloaded and anchored in a housing compartment 39 formed in a case 30 through partitions 301. The loading cartridge 40 has a sliding section 41 on one side to couple with a track 31 in the case 30 for sliding in or out of the case 30. A control card 60 is mounted onto the loading cartridge 40 to connect to a computer host. The control card 60 in the embodiment of this invention is a disk drive array control card.

Figure 5:
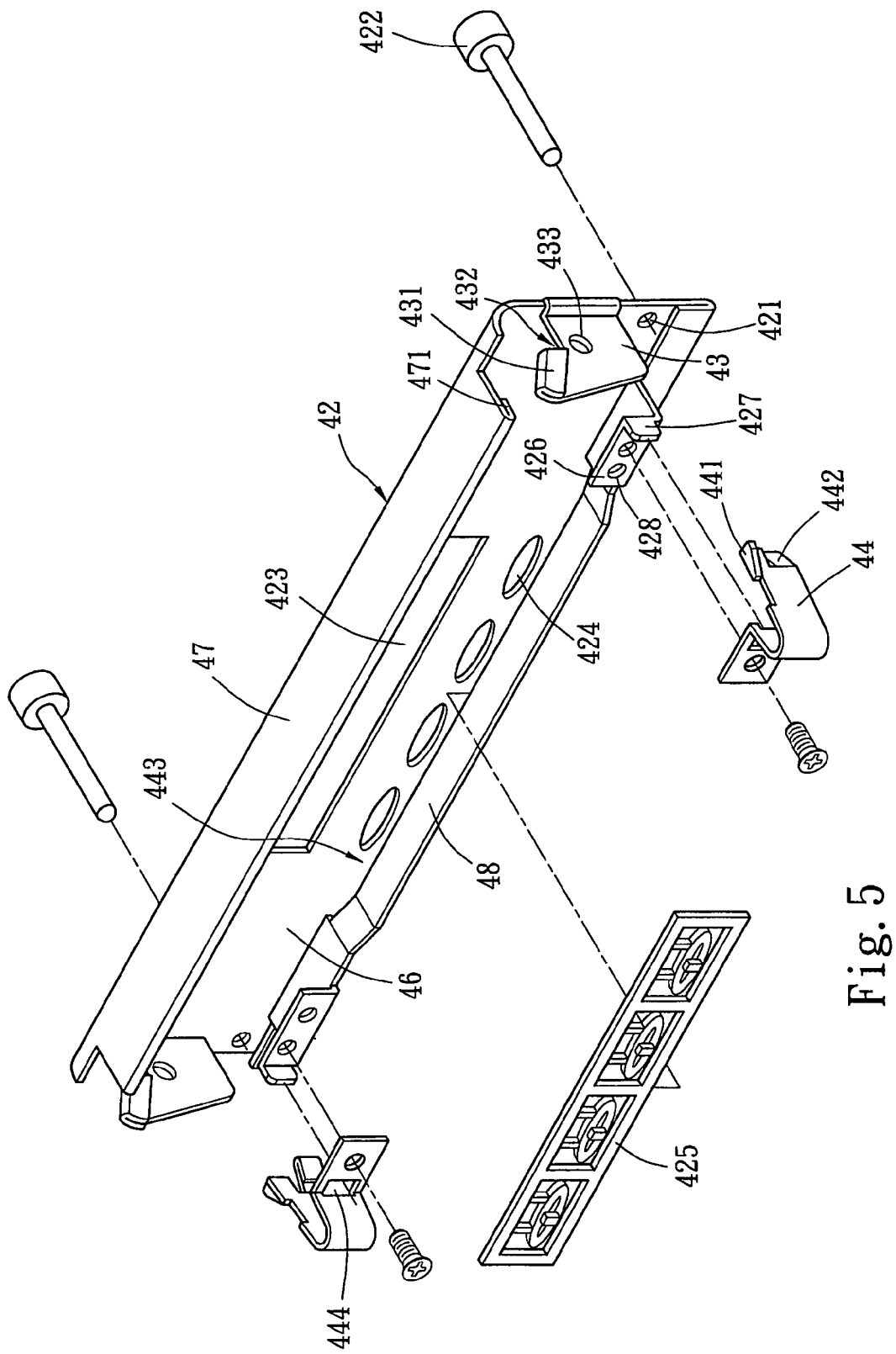
FIG. 5 is an enlarged perspective view of the loading member of the invention.

Referring to FIGS. 4 and 5, the loading member 42 and the loading cartridge 40 are pivotally coupled together through a fastening element running through an aperture 433 formed on a wing flap 43 located on the loading member 42 and an anchor member 45 located on the loading cartridge 40. Thus the loading member 42 is turnable on the loading cartridge 40. The wing flap 43 has a hook 431 and latch notch 432 to latch on an anchor lug 32 on the case 30 to anchor the loading cartridge 40 on the case 30. The hook 431 has a tilted edge which has a peak higher than the anchor lugs 32 on two sides of the front end of the housing compartment 39. There is an elastic 49 located between the loading cartridge 40 and the loading member 42. The loading member 42 has an anchor element 44 located on a lower side. The anchor element 44 has a latch tongue 441 and a sloped surface 442. The anchor element 44 is fastened to a coupling member 426 located on the loading member 42 through a fastening element. The coupling member 426 has a jutting end 427 to run through a retaining hole 444 formed on the anchor element 44 to latch the anchor element 44. The latch tongue 441 may be wedged in a latch hole 33 formed on the case 30 to prevent the loading member 42 from shaking and breaking away. The loading member 42 further has an aperture 421 to allow a pin 422 to insert and ram over the sloped surface 442 to move the anchor element 44 away from the latch hole 33.

Figure 6:
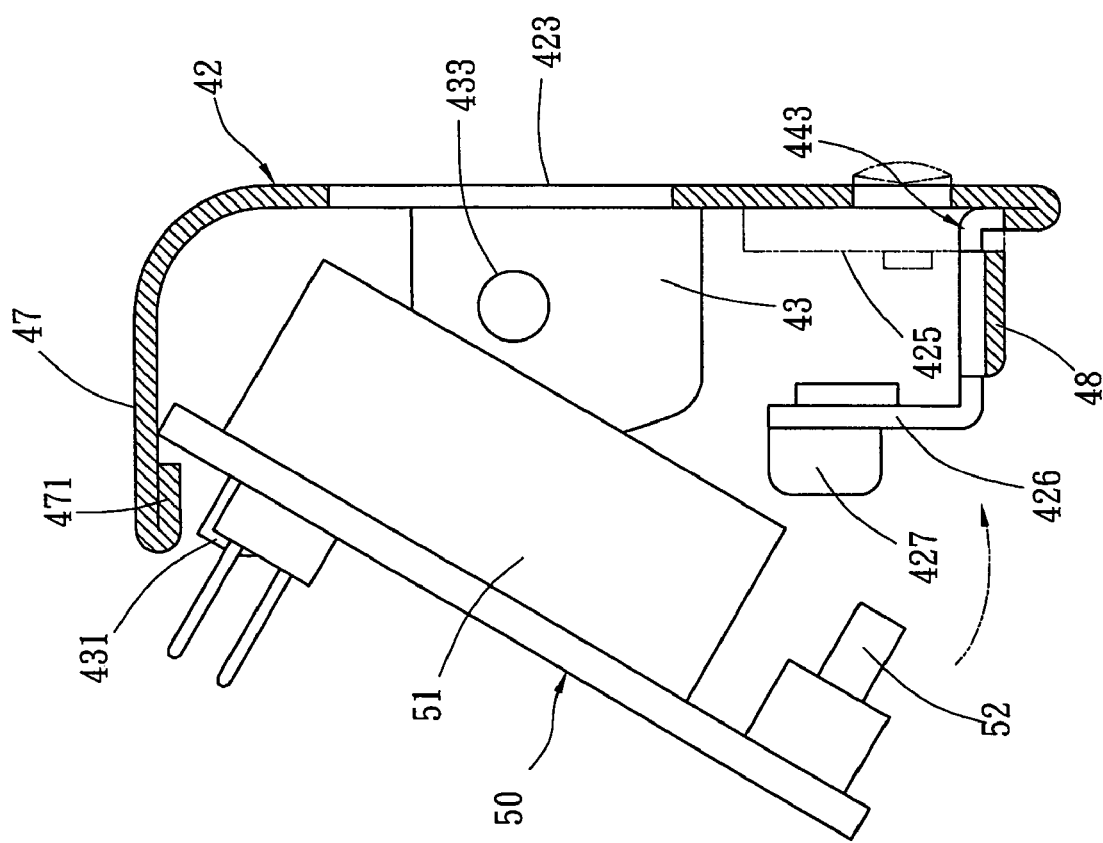
FIG. 6 is a schematic view of the invention showing the display panel and the loading member in a coupled condition.
Figure 7A:
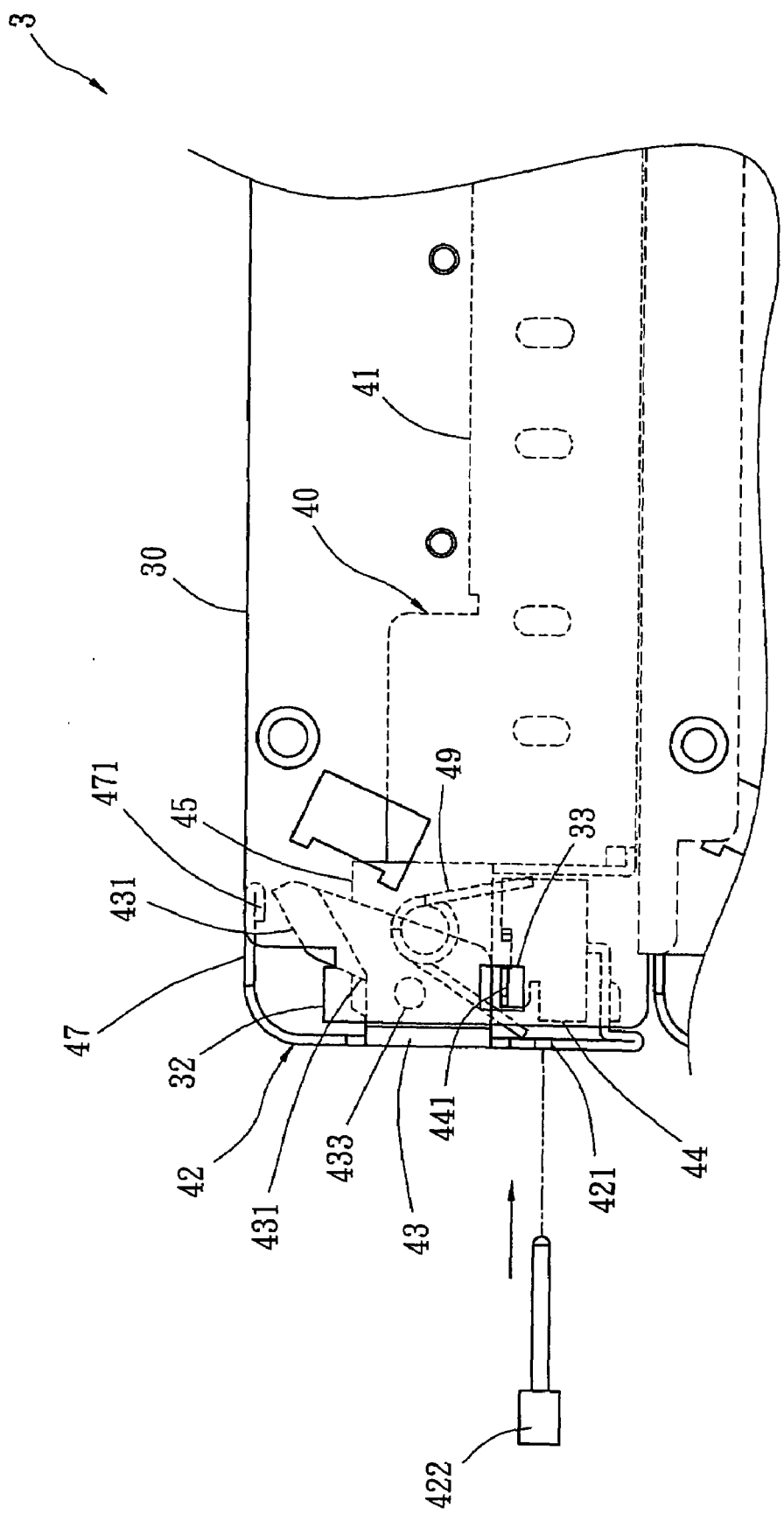
FIGS. 7A, 7B and 7C are side views of the invention in operating conditions.
Figure 7B:
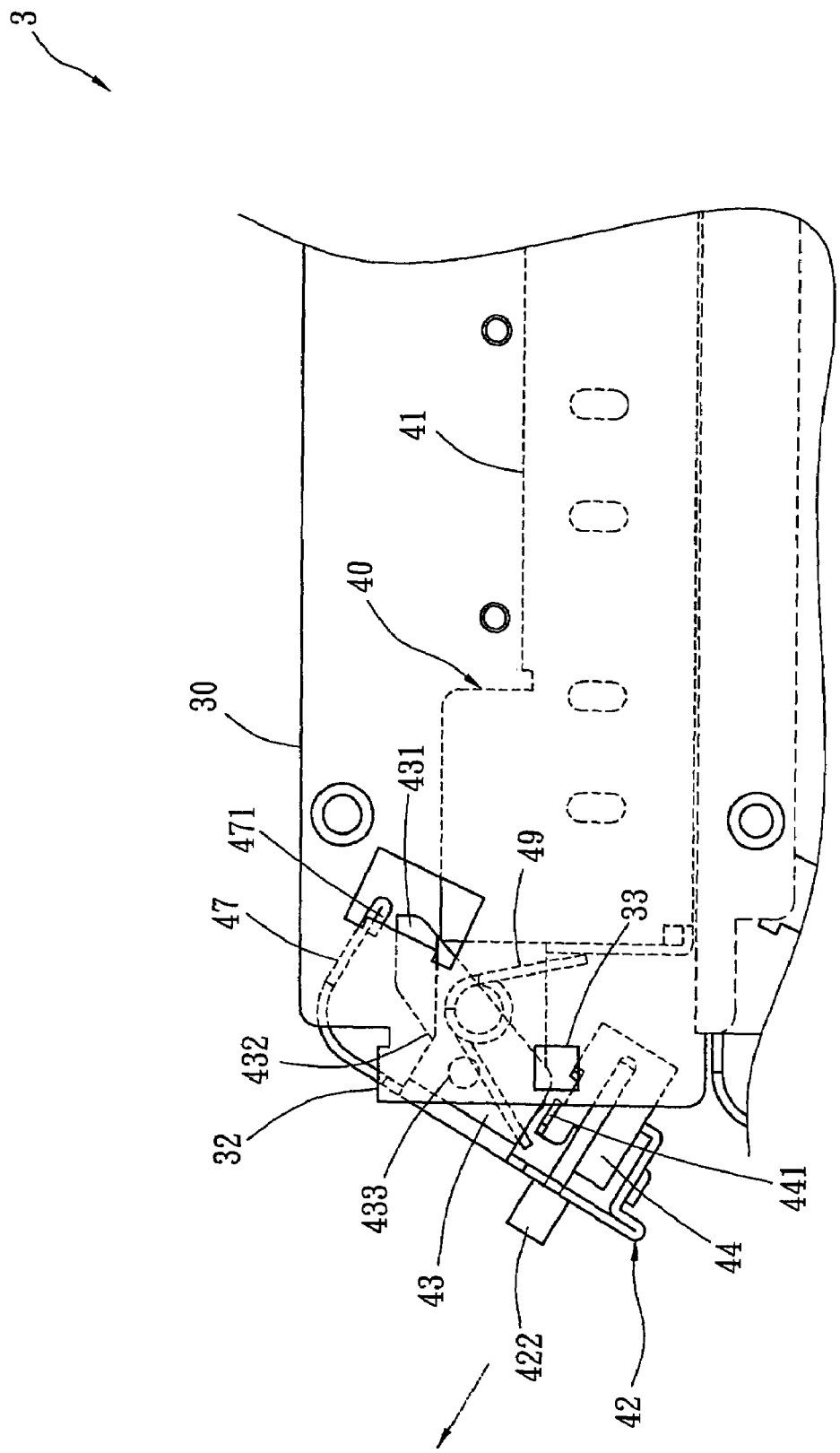
Figure 7C:
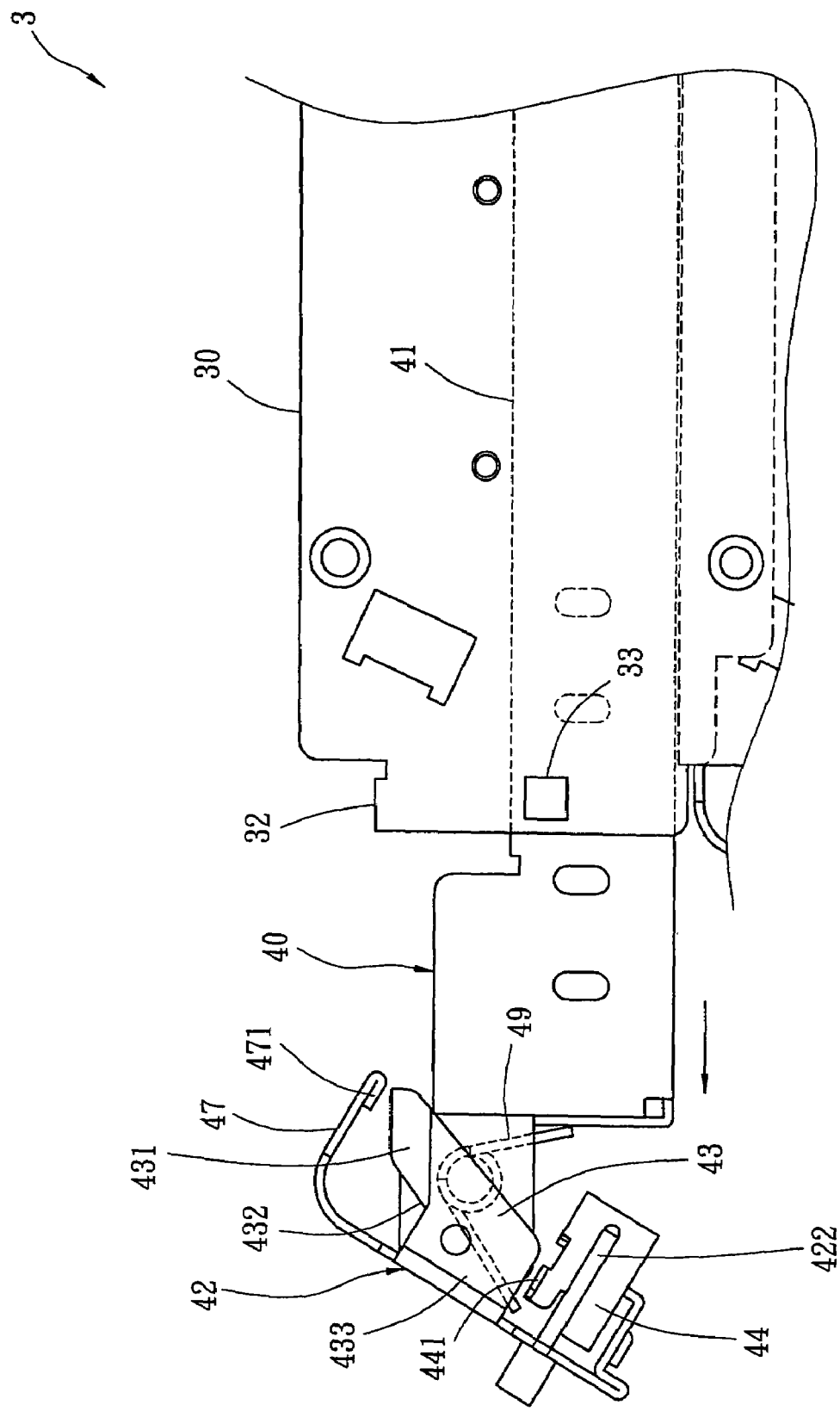

Referring to FIGS. 5 and 6, the loading member 42 has a housing trough 46 on a rear end, and a first flange 47 and a second flange 48 on the upper end and a lower end of the rear side thereof. The first flange 47 is bent downwards to form a retaining section 471. The second flange 48 includes the coupling member 426 and an anchor trough 443. The anchor trough 443 is for holding a flexible key pad 425. A display panel 50 may be placed in the housing trough 46 in a skew manner with the upper end pressing the retaining section 471. Finally, the display panel 50 is fastened to a hole 428 on the coupling member 426. In addition, the surface of the loading member 42 has a first opening 423 corresponding to a display screen 51 of the display panel 50 for seeing the display screen 51, and a second opening 424 to hold a button 52 of the display panel 50. The first opening 423 may be covered by a glass sheet (not shown in the drawings) to protect the display screen 51.

Referring to FIGS. 4, 7A through 7C, to unload the loading cartridge 40 which already held in the housing compartment 39, first, insert the pin 422 into the aperture 421 to slide on the sloped surface 442 of the anchor element 44 (referring to FIG. 5) to disengage the latch tongue 441 from the latch hole 33; next, flip and turn the loading member 42 upwards to a first position to move the tilted edge of the hook 431 at an angle that allows the hook to pass the anchor lug 32, and the latch notch 432 is tilted and can pass the anchor lug 32 to allow the loading cartridge 40 to be removed from the housing compartment 39.

On the contrary, for loading the loading cartridge 40 into the housing compartment 39, flips the loading member 42 upwards to the first position to allow the tilted edge of the hook 431 at the angle that is possible to pass the anchor lug 32; push the loading cartridge 40 into the housing compartment 39; finally move the loading member 42 to a second position where the hook 431 is higher than the anchor lug 32, and the latch notch 432 is engaged with the anchor lug 32 again, and the hook 431 confines the loading member 42 from moving. When the loading member 42 is located on the second position, the latch tongue 441 of the anchor element 44 latches the latch hole 33 to achieve the anchoring effect.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A control card loading and unloading mechanism for loading and unloading a control card and a display panel to facilitate repairs and maintenance, comprising:

a loading cartridge for holding the control card; and a loading member having a wing flap to couple with a front end of the loading cartridge, a housing trough on one side that couples with the loading cartridge for holding the display panel, a coupling member to anchor the display panel and openings to see and control the display panel.

2. The control card loading and unloading mechanism of claim 1, wherein the loading member further has a first flange and a second flange to define the housing trough.

3. The control card loading and unloading mechanism of claim 2, wherein the first flange has a retaining section.

4. The control card loading and unloading mechanism of claim 1, wherein the coupling member has a jutting end.

5. The control card loading and unloading mechanism of claim 4, wherein the loading member has an anchor element which has a retaining hole to couple with the jutting end for anchoring.

6. The control card loading and unloading mechanism of claim 1, wherein the wing flap has a hook and a latch notch.

7. The control card loading and unloading mechanism of claim 1 further having an elastic element located on the coupling area of the loading member and the loading cartridge.

8. The control card loading and unloading mechanism of claim 1, wherein the loading member has an aperture on the surface to receive a pin.

9. The control card loading and unloading mechanism of claim 1, wherein the openings include a first opening and a second opening to see and control the display panel.

10. The control card loading and unloading mechanism of claim 1, wherein the control card is a disk drive array control card.

* * * * *